T. C. PHELPS.
DETACHABLE HANDLE FOR COOKING UTENSILS.
APPLICATION FILED AUG. 16, 1915.
1,180,941.  Patented Apr. 25, 1916.
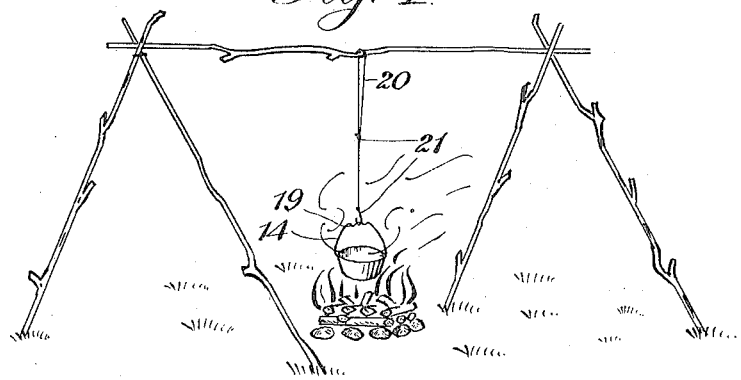
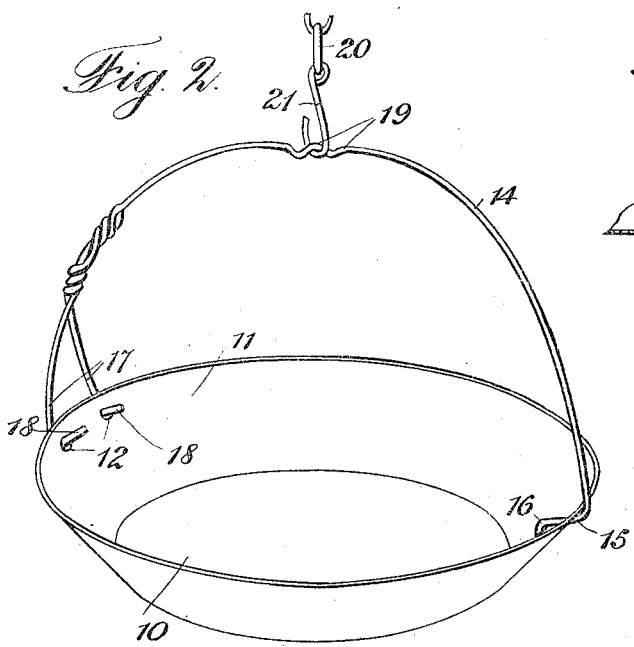
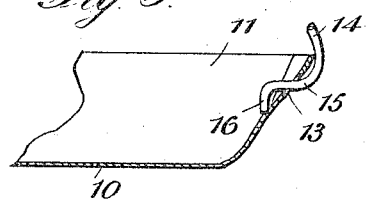
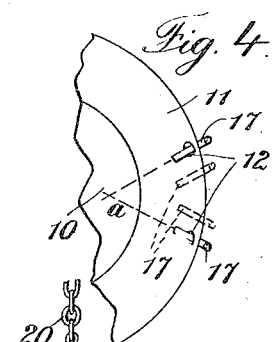
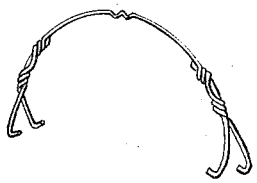
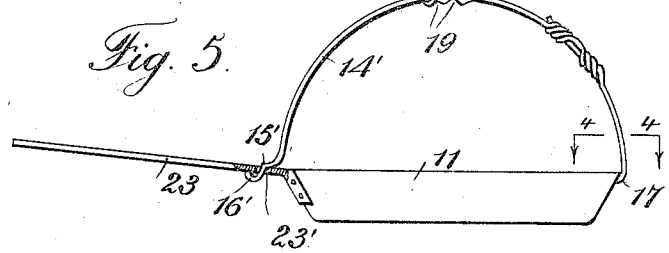
WITNESSES
Otto Fricke.
Geo. L. Beeler
INVENTOR
Thomas C. Phelps
BY Munn & Co
ATTORNEYS

UNITED STATES PATENT OFFICE.

THOMAS C. PHELPS, OF NEW YORK, N. Y.

DETACHABLE HANDLE FOR COOKING UTENSILS.

1,180,941.　　　　Specification of Letters Patent.　　Patented Apr. 25, 1916.

Application filed August 16, 1915.　Serial No. 45,697.

*To all whom it may concern:*

Be it known that I, THOMAS C. PHELPS, a citizen of the United States, and a resident of the city of New York, borough of Manhattan, in the county and State of New York, have invented a new and Improved Detachable Handle for Cooking Utensils, of which the following is a full, clear, and exact description.

This invention relates to culinary utensils, and has particular reference to detachable handles or bails for frying pans or other cooking utensils.

The primary object of the invention is to provide a simple and efficient form of handle or bail adapted to be detachably connected to any suitable type of frying pan, stewing kettle or the like, the manner of connecting the handle to the vessel providing for the maximum stability and rigidity.

Another object of the invention is to facilitate the close nesting or packing of a number of different types or sizes of cooking receptacles along with one or more handles therefor and also suspension devices and other implements usually employed in hunting or camping outfits.

The foregoing and other objects of the invention will hereinafter be more fully described and claimed and illustrated in the drawings forming a part of this specification in which like characters of reference indicate corresponding parts in all the views, and in which—

Figure 1 is a diagram indicating the purpose and manner of operation of the invention; Fig. 2 is a perspective view of a frying pan fitted with my improved detachable handle and showing the relation of the suspension device thereto; Fig. 3 is a vertical sectional detail showing one manner of connecting that end of the bail having a single hook to the utensil; Fig. 4 is a detail plan view on the line 4—4 of Fig. 5; Fig. 5 is a side elevation of a modified adaptation of the invention; and Fig. 6 is a perspective view of a slight modification of the bail.

The handle or bail constituting the subject matter of this invention is preferably made of metal wire of sufficient body to support the several utensils with which it is adapted to be used. Obviously I do not propose to be limited to any metal or material, and the specific design or designs thereof illustrated are to be interpreted as illustrative rather than in a limiting sense, since the form of the device may be modified to a considerable extent without departing from the spirit of the invention hereinafter claimed.

In providing a camping outfit it is essential or at least important that all of the utensils and accoutrements be of a compact nature adapting them to be easily packed and transported. I prefer, therefore, to provide frying pans and other cooking utensils without fixed or permanent handles. Several frying pans, stewing kettles, as well as plates, pie pans, or the like, may be so nested as to occupy but a trifle more space than a single one of such utensils. The suspension devices, drinking cup, knives, forks, spoons, etc., for such outfit may obviously be carried within the collection of larger utensils. It is to be observed, furthermore, that through this invention I provide a convenient and efficient means for supporting a frying pan over a fire independently of the direct ground supports, as through a flexible member or chain suspended from any suitable overhead support, the nature of the handle providing through its connections with the frying pan a suitable support therefor, preventing excessive tipping or tilting thereof in practice.

By way of illustration and emphasis of the advantages of this invention, I show a frying pan having a bottom 10 and a shallow flaring rim 11, the bottom and rim being circular in plan view. The pan rim is provided with any suitable number of holes adjacent its upper edge for the attachment of supporting means, and in the views I show for this purpose a pair of holes 12 on one side and a single hole 13 on the other side.

The preferred form of handle is shown at 14 and comprises a single hook 15 adapted to extend inwardly through the hole 13 and having a point 16 bearing against the inner surface of the flange 11 below the hole 13. The main portion of the handle adjacent the hook 15 lies outside of the top of the pan and may bear against the outer periphery thereof whereby the extent of movement of the hook into or through the hole 13 is limited, and when the handle is finally adjusted the point 16 bearing against the rim prevents the outward movement of the hook. At the other side of the pan the handle is provided with a plurality of hooks 17 shown herein as two in number, the points 18 of which project inwardly through said holes 12 from the outside of the pan and converge toward a point within the pan closely adjacent the rim 11, as shown at *a*, Fig. 4. The hooks 17, therefore, constitute not only main supporting means for the pan at this end of the handle, but because of the nature of the material from which the handle is made, there is a constant tendency for the hooks 17 to approach each other due to the convergence of the points thereof in connection with the elasticity of the hook shanks.

As indicated in dotted lines in Fig. 4, the normal tendency is for the hooks 17 to lie close to each other and hence the resiliency of the shanks tending to cause the hooks to assume their normal position will prevent any accidental disconnection of the points 18 from the holes 12. In applying the handle to the cooking utensil, the single hook 15 is first passed through the hole 13 and then the handle is swung over, locking the hook 15 as above set forth, and the hooks 17 are then spread far enough to allow their points to pass inwardly through the holes 12. The handle having three points of contact is not subject to looseness or rattling, and the points of contact providing for a rigid connection prevent tilting or spilling of even the shallowest frying pan. At the top of the handle and midway between the two ends thereof I provide a series of notches 19 shown in this case as three in number in a closely arranged series. The outfit, as above intimated, includes one or more suspension chains 20 having a hook 21 at each end. One hook coöperates with any one of the notches 19 depending upon the desired balance for the frying pan, and the other hook passes over the overhead support and is made to coöperate with any link of the chain, depending upon the elevation desired for the cooking utensil.

In Fig. 5 I show the adaptation of the handle 14′ to a frying pan, for example, which has a fixed rigid handle 23. The handle 14′ has preferably the same pair of hooks 17 at one end as is described above, and at the other end the single hook 15′ is passed downwardly through a hole 23′ punched through the handle 23. The point 16′ of this hook bears upwardly against the bottom of the handle and the main portion of the hook 15′ bears against the upper surface of the handle whereby a positive lock between the hook and the handle 23 is effected. This figure indicates the desirability of having a plurality of notches 19 because the handle 23 has a tendency to overbalance the frying pan. This tendency is counteracted by placing the hook 21 in one of the side notches 19, as shown. It will be noted in both forms of the invention that the top of the utensil is left free for the direct application of a lid thereto, all parts of the handle being outside of the utensil except the mere points which lie below the plane of the upper edge of the rim.

While it is preferable to employ a single hook at one end of the bail and two hooks at the other end, it is obvious that bails may be made as shown in Fig. 6, having two hooks or prongs at each end. I wish it to be understood also that a claim hereinafter made specifying a bail having a pair of hooks at one end and one hook at the other end is not exclusive of a bail having a pair of hooks at each end.

Having thus described my invention, I claim as new and desire to secure by Letters Patent:—

1. The combination with a utensil having a rim provided with a plurality of oppositely arranged holes therethrough, of a handle having at one end a hook passing through one of said holes and at its other end a pair of hooks having converging points passing through other of said holes.

2. The combination with a pan having oppositely arranged holes in its rim, of a handle of resilient material having at one end a hook passing inwardly through a hole in the rim at one side thereof and at the other end a pair of hooks lying normally close together and passing through a pair of rim holes at a greater distance apart than the normal distance between the hooks, the points of the hooks converging toward each other whereby, after the hooks are passed through the holes, they automatically lock the handle in position.

3. The combination with a utensil having a pair of holes on one side of the rim and a single hole on the other side thereof, of a handle having at one end a single hook and having at its other end a pair of hooks adapted to pass through the pair of holes, thereby locking the single handle hook from movement in any direction, and providing a stable connection between the handle and the utensil.

In testimony whereof I have signed my name to this specification in the presence of two subscribing witnesses.

THOMAS C. PHELPS.

Witnesses:
 Geo. L. Beeler,
 Philip D. Rollhaus.